Figure 1:
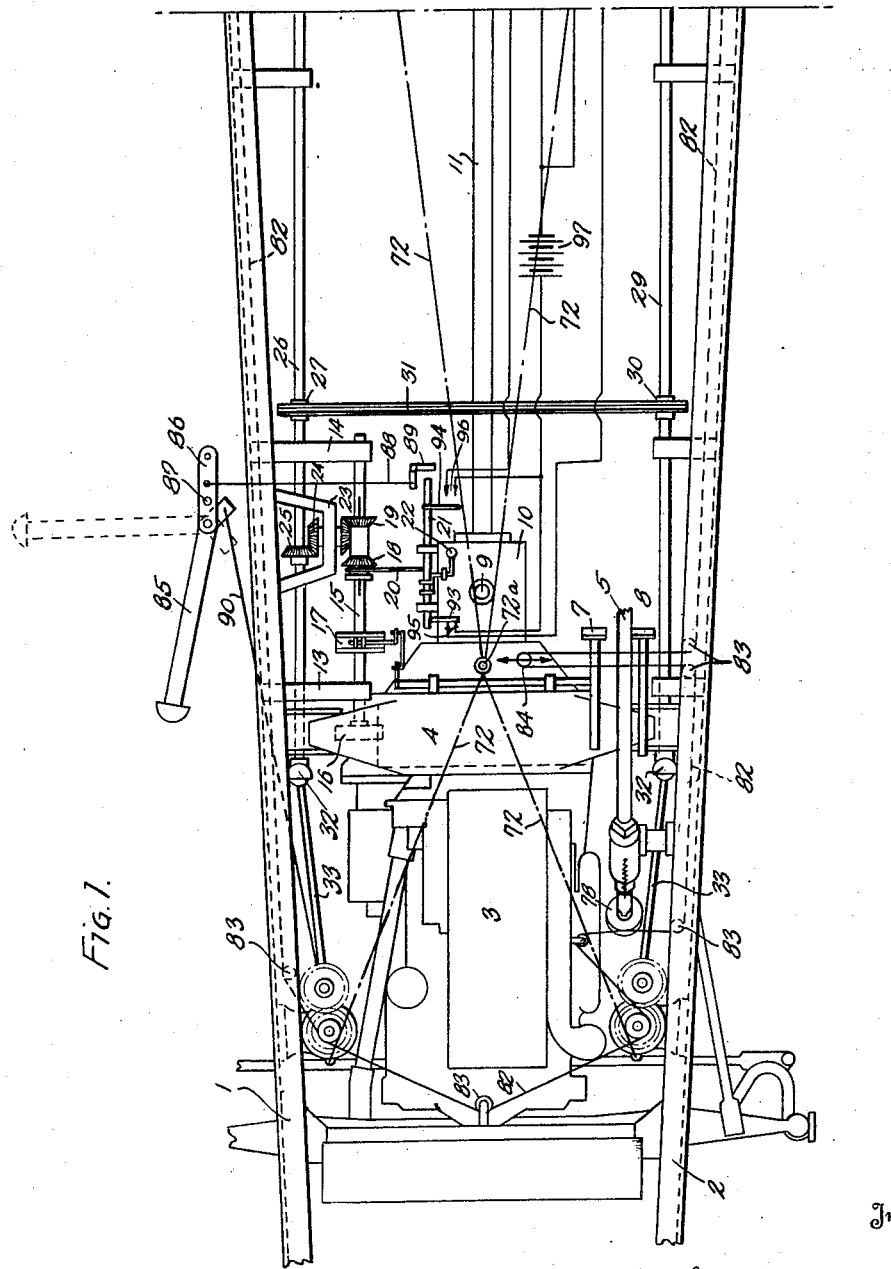

May 12, 1931. A. E. MILLER 1,804,887
AUXILIARY PROPELLING MEANS FOR MOTOR VEHICLES
Filed March 7, 1927 7 Sheets-Sheet 1

Inventor
Arthur E. Miller,
By Smith & Michael.
Attorney

May 12, 1931.  A. E. MILLER  1,804,887
AUXILIARY PROPELLING MEANS FOR MOTOR VEHICLES
Filed March 7, 1927   7 Sheets-Sheet 2

Inventor
Arthur E. Miller,
By Smith & Michael.
Attorney

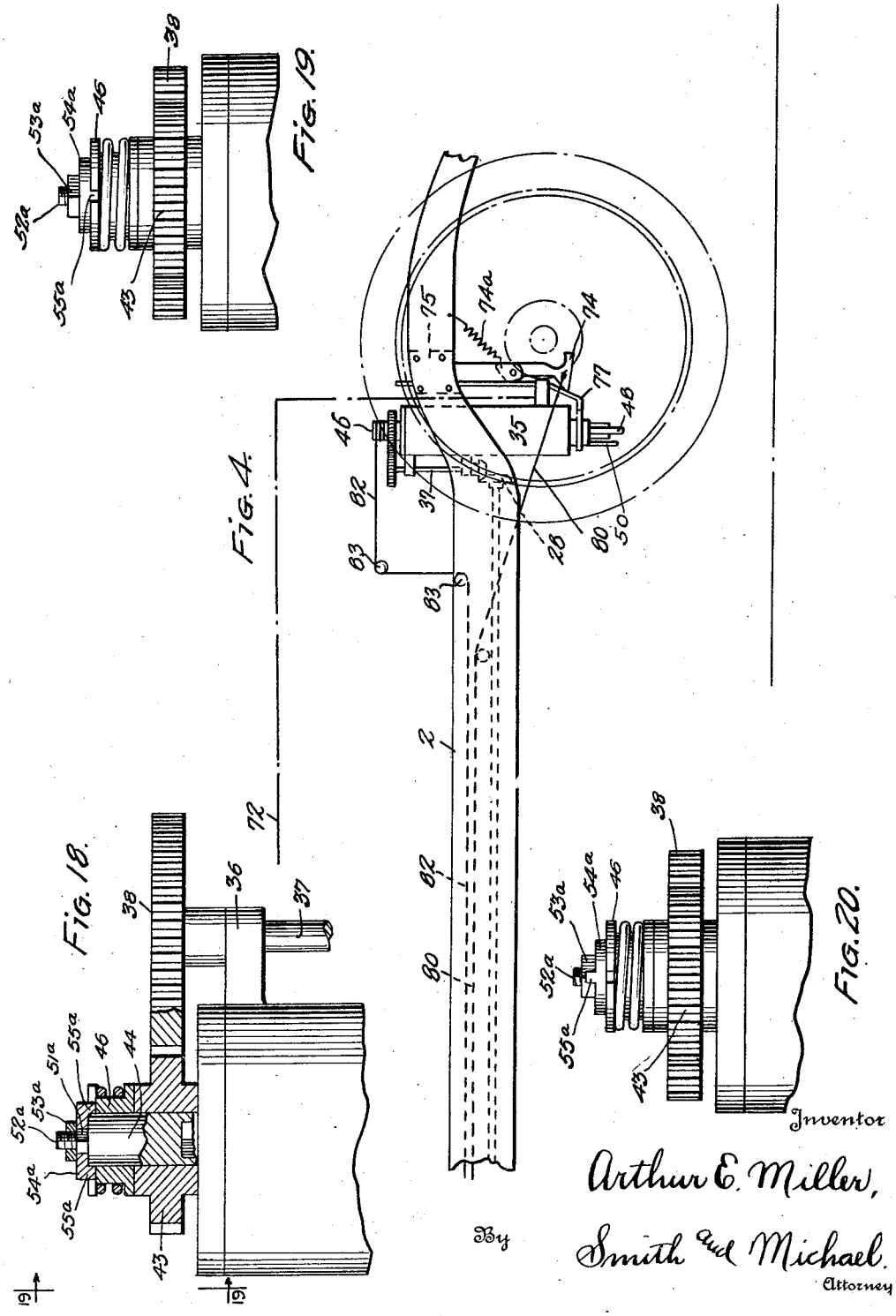

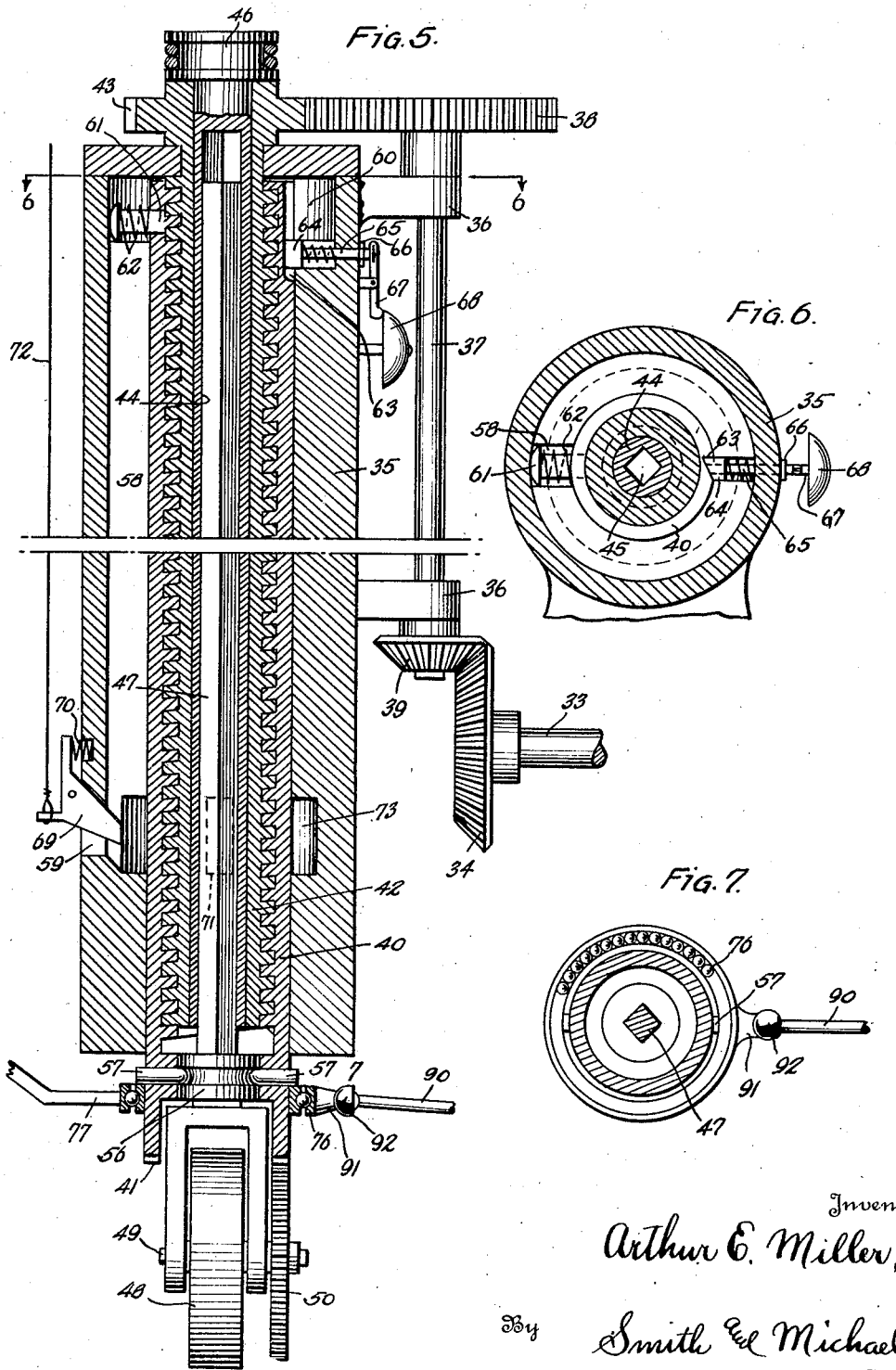

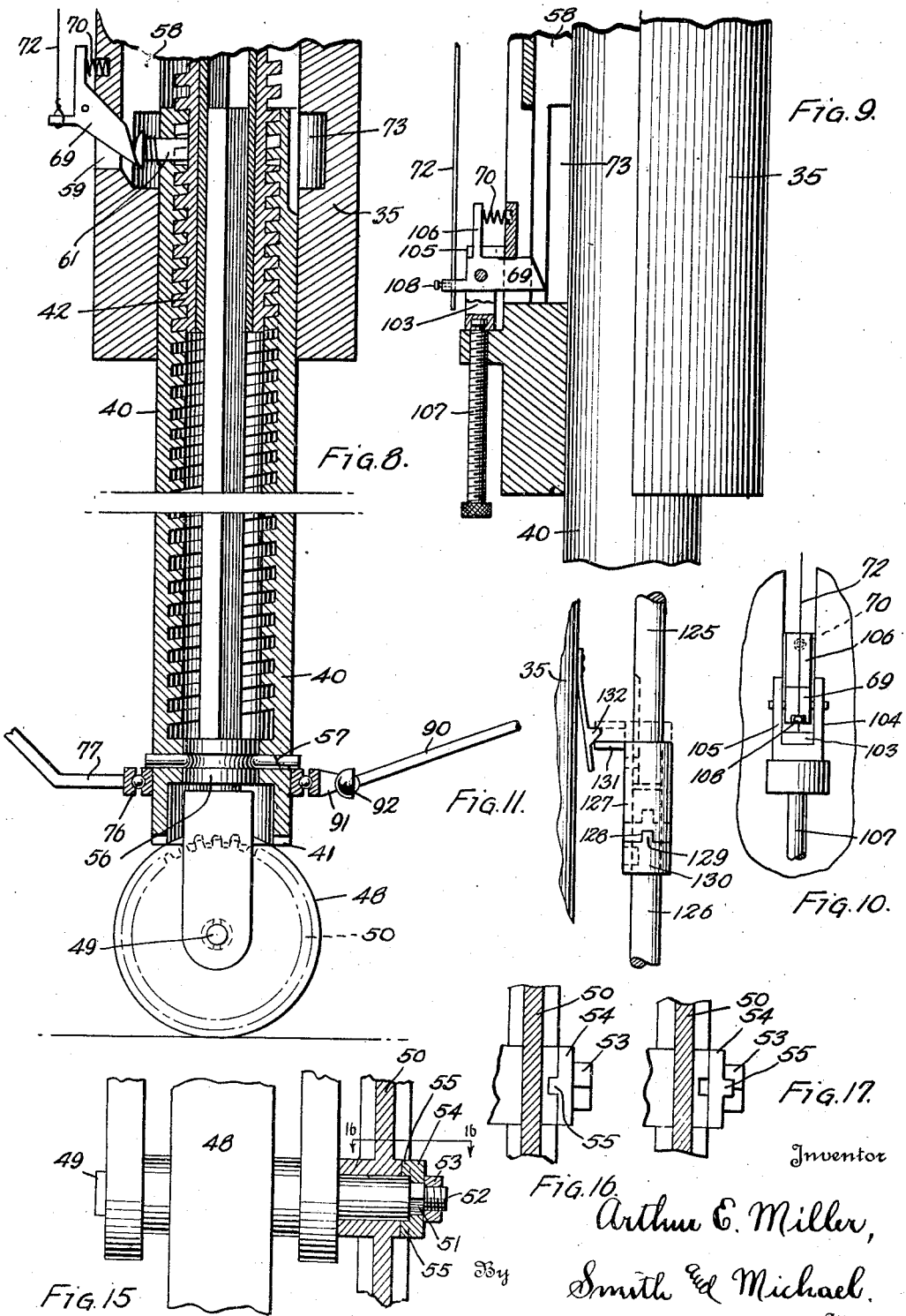

May 12, 1931.  A. E. MILLER  1,804,887
AUXILIARY PROPELLING MEANS FOR MOTOR VEHICLES
Filed March 7, 1927  7 Sheets-Sheet 7
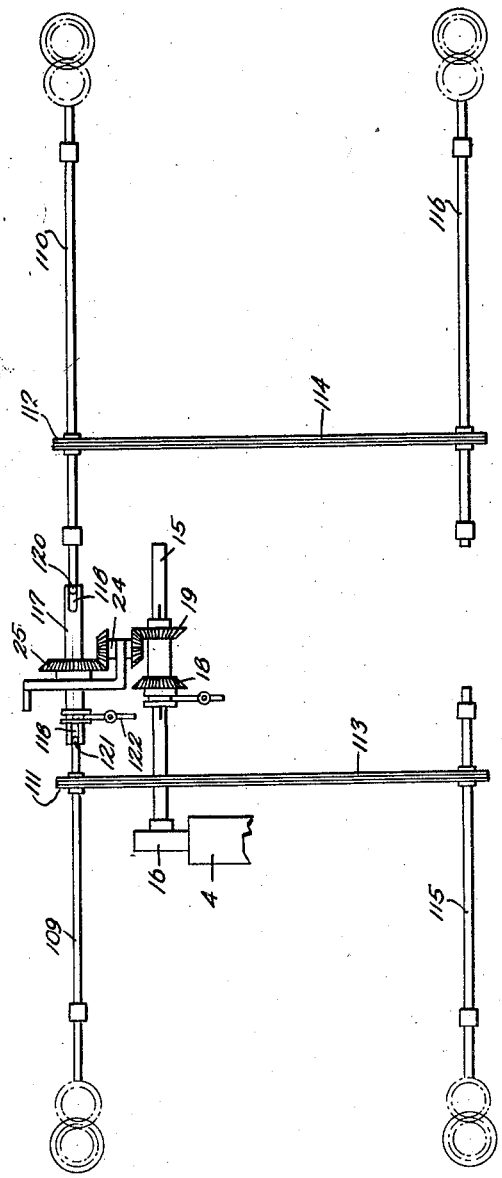
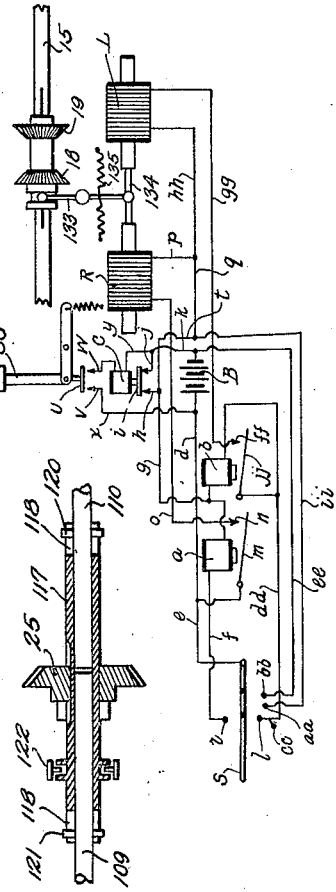
Inventor
Arthur E. Miller,
By Smith & Michael.
Attorney.

Patented May 12, 1931

1,804,887

UNITED STATES PATENT OFFICE

ARTHUR E. MILLER, OF SACRAMENTO, CALIFORNIA

AUXILIARY PROPELLING MEANS FOR MOTOR VEHICLES

Application filed March 7, 1927. Serial No. 173,559.

My invention relates to auxiliary propelling means for motor vehicles, and has particular reference to an improvement adapted for attachment to any of the standard types of automobiles, trucks, tractors or the like, whereby one or more of the wheels of the vehicle may be raised from its normal ground-engaging position and the said vehicle propelled and steered by said auxiliary propelling means.

An object of my invention is to provide an auxiliary propelling means adapted for attachment to the chassis of a motor vehicle, and so associated and connected therewith that the motor of said vehicle may be operatively coupled with said auxiliary propelling means to operate a wheeled jack or jacks adapted to raise one or more of the ground engaging wheels from contact with the ground and to operate the supplemental or auxiliary propelling means so as to move the vehicle laterally to the right or left of its normal line of travel, or in any direction desired.

An object of my invention is to provide an auxiliary propelling means for motor vehicles comprising auxiliary or supplemental traction wheels which are normally out of ground engaging position but which may be forced into ground engaging position to raise the vehicle wheels off of the ground, said auxiliary traction wheels then functioning to support the vehicle and to propel the same to the right or left of the normal line of travel, or in any direction desired, and to associate with said auxiliary traction means a novel mechanism whereby said auxiliary traction wheels may be coupled to and steered by the usual steering wheel and steering shaft located on said vehicle and normally functioning to operate and control the front steering wheel thereof, whereby the said auxiliary propelling means may be steered to control the direction of travel of the vehicle.

A further object of my invention is to provide an auxiliary propelling means for motor vehicles comprising a series of lifting jacks provided with traction wheels at their lower ends and so operated that the motor of the vehicle can be coupled to the said jacks to raise or lower one or more of the normal ground-engaging wheels of the vehicle from or to contact with the ground, the operation of said jacks being under the control of the operator of the vehicle through the medium of a single operating switch or lever and the mechanism being so constructed and arranged that the traction wheels are automatically driven as soon as they have reached the limit of their downward movement, means also being provided for stopping the drive of the traction wheels and automatically raising the jack or jacks to return the vehicle wheels to their normal ground engaging position.

A still further object of my invention is to embody in an auxiliary propelling means for motor vehicles, various mechanisms which will materially aid in the production of a simplified and highly efficient device of this character, such mechanism including among other features, means for raising and lowering the normal ground-engaging wheels, means for driving and steering the auxiliary propelling wheels, an indicator positioned within the view of the operator for showing the direction of the auxiliary traction wheels, means for automatically disengaging the main clutch of the vehicle when the jacks are lowered and for automatically restoring the clutch to the engaged position when the jacks are raised, means operated by the usual brake lever of the vehicle for braking the operation of the auxiliary propelling wheels, a bumper or safety device automatically moved into position upon the downward movement of the jack or jacks and functioning to disconnect the auxiliary drive mechanism when the bumper or safety device contacts with the curbing or other obstruction, a parking indicator or signal positioned on the body of the vehicle to indicate to pedestrians or other motorists the fact that the vehicle is about to be propelled toward the right or left with respect to its normal line of travel, means whereby either the front or rear pairs of jacks may be disconnected from the drive mechanism when it is desired to lift only the rear or front wheels of the vehicle, from the ground, means whereby any one of the jacks may be operated without operating the remaining jacks of the series, means for adjusting the length of the jack to enable any particular jack or set of jacks to be applied to vehicles having different diameter wheels or tires or different distances between the chassis frame and ground, means for disconnecting any or all of the individual traction wheels from the drive mechanism thereof, and means, either electrical or mechanical, under the direct control of the operator whereby each of the several mechanisms may be properly controlled.

Figure 2:
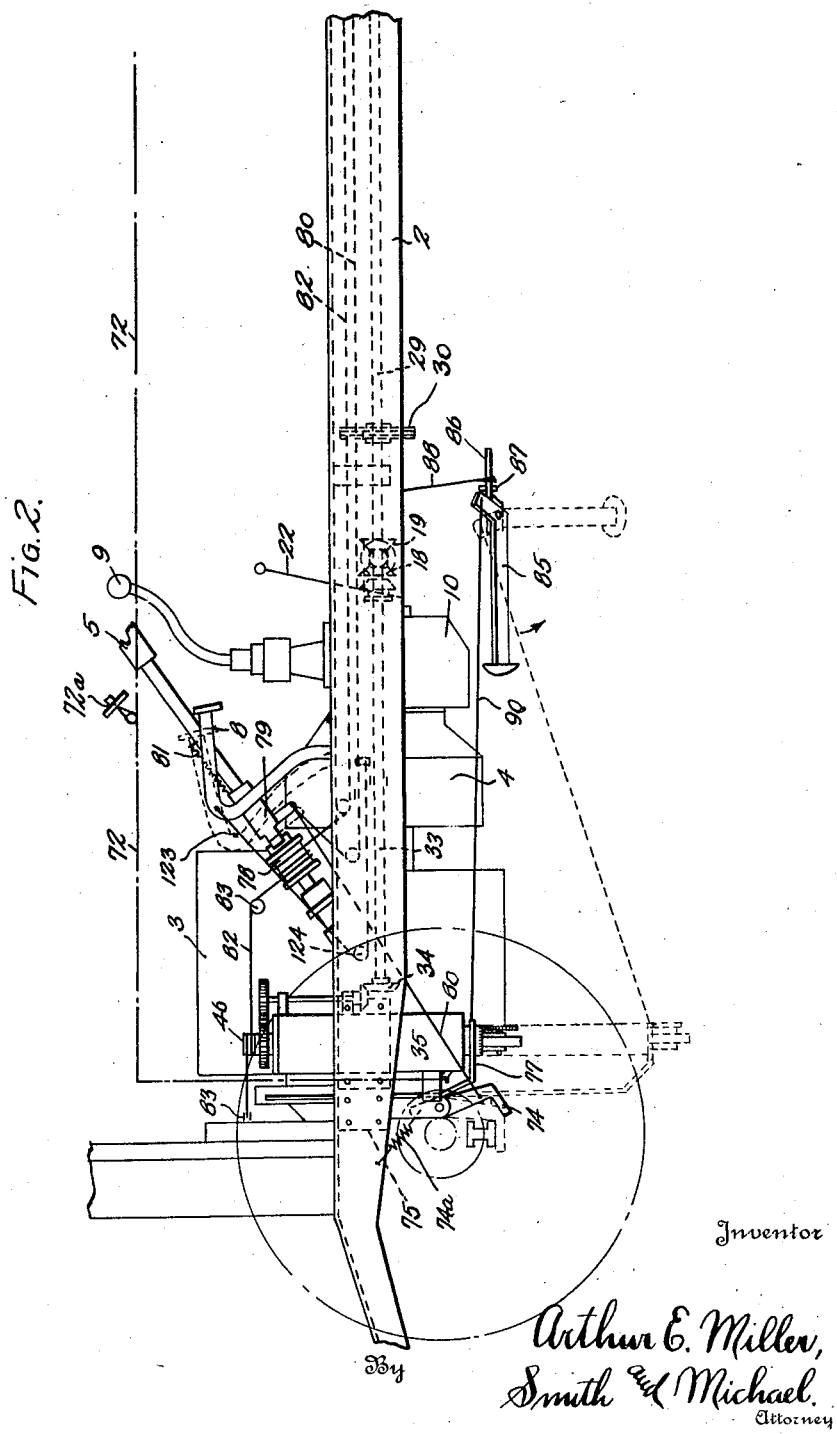
Figure 3:
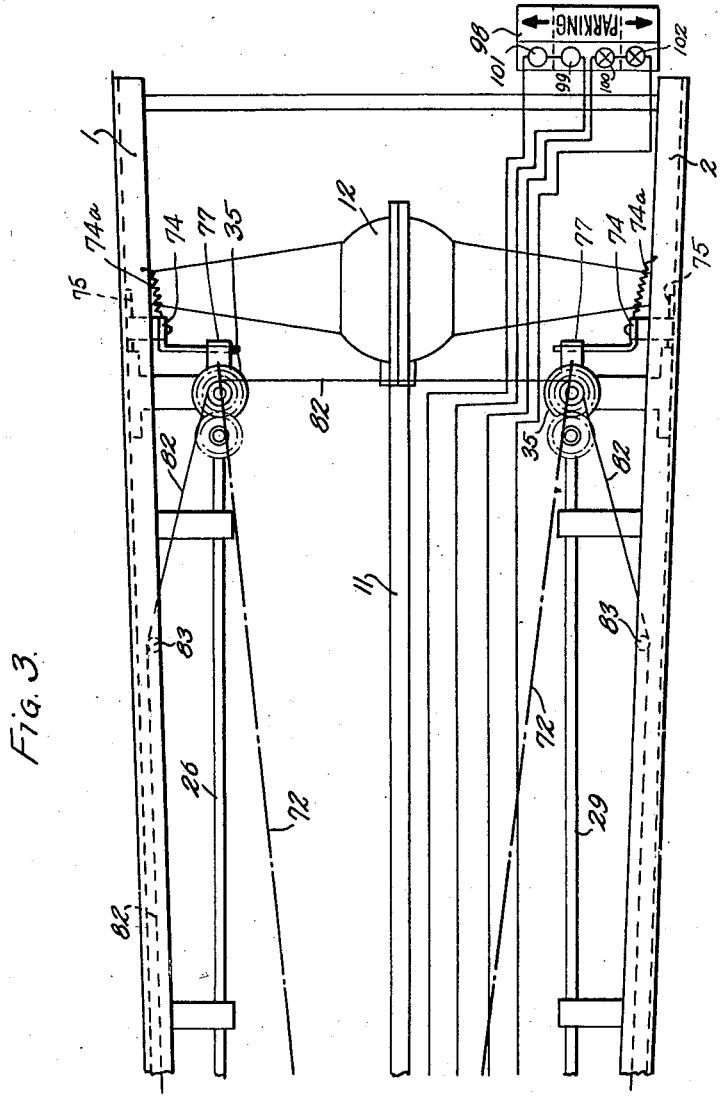

In the accompanying drawings wherein is shown a preferred embodiment of my invention, Figs. 1 and 2 are plan and side elevation views, respectively, of the forward half or end of the chassis of a motor vehicle showing my invention affixed thereto, Figs. 3 and 4 are plan and side elevation views, respectively, of the rear half or end of the chassis shown in Figs. 1 and 2, Fig. 5 is an enlarged view, partly in section showing the jack in raised position and showing details of construction of the individual auxiliary propelling and steering mechanism, Fig. 6 is a transverse sectional view on the line 6—6 of Fig. 5, Fig. 7 is a transverse sectional view on the line 7—7 of Fig. 5, Fig. 8 is an enlarged fragmental vertical sectional view showing the jack in lowered position with the traction wheels in contact with the ground.

Fig. 9 is an enlarged fragmental view, partly in section, showing in detail the means whereby the jack may be adjusted to regulate the vertical position of the traction wheels, Fig. 10 is an end elevation, partly in section, showing the detailed construction of the adjusting means shown in Fig. 9, Fig. 11 is a fragmental sectional view of the clutch means for disconnecting the drive of any one of the series of jacks so that one or more of said jacks can be rendered inoperative, Fig. 12 is a plan view showing a modification of the form of my invention shown in the preceding figures and showing selective clutch means whereby the front or rear pairs of jacks can be disconnected from the main drive of the auxiliary propelling mechanism, Fig. 13 is a fragmental, horizontal sectional view of the specific clutch mechanism shown in Fig. 12, Fig. 14 is a diagrammatic view showing the wiring diagram and electrical devices adapted to electrically control the raising or lowering and the driving of the auxiliary propelling device, Fig. 15 is an enlarged view, partly in section, of one of the traction wheels positioned at the lower end of the jack mechanism and showing the means whereby the driving mechnism may be disconnected from said wheels, Fig. 16 is a fragmental view on the line 16—16 of Fig. 15, showing the drive connected to the auxiliary traction wheels, Fig. 17 is a fragmental view on the line 16—16 of Fig. 15 showing the drive disconnected from the auxiliary traction wheels, Fig. 18 is an enlarged fragmental view, partly in section, of the upper portion of one of the jacks, showing means whereby the steering drive connection between the steering reel or drum of each jack may be selectively connected to or disconnected from its associated auxiliary propelling and steering wheel, Fig. 19 is a fragmental view on the line 19—19 of Fig. 18, showing the operative or effective steering drive connection between the steering reel or drum and its associated auxiliary propelling and steering wheel, and Fig. 20 is a fragmental view on the line 19—19 of Fig. 18, showing the steering reel or drum disconnected from the auxiliary propelling and steering wheel.

Referring to the accompanying drawings wherein like reference numerals are employed to designate like parts throughout the several views, the reference characters 1 and 2 designate the two main side beams of the chassis frame of an automobile, truck, tractor or other motor vehicle, said chassis frame supporting an internal combustion or other motor 3 having the usual fly-wheel 4 carried at the rear of the motor. The chassis also carries the usual steering shaft 5 for steering the front wheel of the vehicle, and also the usual foot brake lever 7, clutch pedal 8, gear shift lever 9 and transmission 10. A main drive shaft 11 extends rearwardly from the transmission 10 to the differential 12, it being understood that the power of the engine is transmitted through the clutch, transmission, drive shaft, and differential to the rear wheels of the vehicle as is the usual practice. All of the above construction is a known part of my novel combination.

At the right hand side of the chassis frame 1, I rigidly secure two inwardly extending arms or brackets 13 and 14 in the ends of which are journalled a longitudinally extending shaft 15, provided at the forward end with a spur gear 16 which is in constant engagement with teeth which I rigidly secure on the fly wheel 4 by means of which the shaft 15 is driven when the motor 3 is operating. Intermediate the ends of the shaft 15 I provide a brake drum 17 having an external expanding and contracting brake band connected through suitable linkage with the foot lever 7 whereby when the said foot lever is depressed, the brake band is contracted and the rotation of the shaft 15 slowed down or stopped. Slidably mounted on the shaft 15 and keyed to rotate therewith is a spool gear having inwardly beveled gears 18 and 19, said spool gear being connected through a yoked lever 20 with a longitudinally movable shaft 21 supported on the side of the case of the transmission 10 and adapted to be moved back and forth by means of an operating lever 22 extending through the floor board of the vehicle and in convenient reach of the operator. A bracket 23 is rigidly secured to the right hand chassis beam 1 between the bracket arms 13 and 14 and has journalled therein a double ended beveled gear 24 adapted to be selectively driven by either of the gears 18 or 19 depending upon the direction of rotation desired.

The outer end of the gear 24 meshes with a bevelled gear 25 rigidly secured on a longitudinally extending shaft 26 provided with a sprocket 27 and having at its rear end a bevelled gear 28 for a purpose to be hereinafter described. At the left side of the chassis, the beam 2 is provided with spaced inwardly-extending brackets which support a second longitudinally extending shaft 29 provided with a sprocket 30 at a point opposite the sprocket 27 on the shaft 26 and having at its rear end a bevelled gear corresponding to the bevelled gear 28 of the shaft 26, the two sprockets 27 and 30 being connected by a sprocket chain 31. At the forward ends of the shafts 26 and 29 are universal driving joints 32 connected to shafts 33 each having at their forward ends a bevelled gear 34.

It is apparent from the above described construction that when the hand lever 22 is in its neutral position, neither of the gears 18 or 19 are in contact with the gear 24 and that the shaft 15 is free to rotate without imparting rotation to the shafts 26 or 29. When, however, it is desired to drive the shafts 26 and 29, the lever 22 is moved to the "right" or "left" position, thus moving the shaft 21, and, through the connecting lever 20, the spool gear, whereby either of the gears 18 or 19 may be brought into mesh with the gear 24 to rotate the shafts 26 and 29 in either a clockwise or counter-clockwise direction as desired.

*Means for lowering and driving auxiliary propelling wheels*

At or near each of the four corners of the chassis frame of the vehicle, I provide an auxiliary propelling and steering cylinder, the detailed construction of which is best shown in Figs. 5 to 8 inclusive. Each of these devices comprise an outer hollow cylinder 35 rigidly secured to the main chassis frame and having a pair of spaced, radially extending lugs 36 in which is journalled the vertically extending shaft 37. The upper end of the shaft 37 is provided with a spur gear 38, while the lower end of said shaft is provided with a bevelled gear 39 adapted to mesh with and be driven by the bevelled gears 28 or 34 above referred to.

Within the cylinder 35 and concentric therewith is an inner cylinder 40, said cylinder having a smooth outer surface and a threaded inner surface and the bottom of said cylinder extending below the bottom of the cylinder 35 and having a series of axially extending teeth constituting an annular gear 41. Within the cylinder 40 is a second cylinder 42 having a smooth inner bore and having its outer surface threaded throughout its length to engage the threads on the inner surface of the cylinder 40. The upper end of the cylinder 42 extends through the top of the outer stationary cylinder 35 and has its upper end toothed to form a gear 43 in mesh with the gear 38 whereby said inner sleeve or cylinder 42 is rotated. Within the cylinder 42 is a third cylinder 44 having a smooth outer surface and having a rectangular central passage 45 extending therethrough. The upper end of this cylinder 44 extends through the top of the outer stationary cylinder 35 and through the top portion of the cylinder 42 and is provided at its upper end with a reel or pulley 46 for a purpose to be hereinafter described.

A relatively long bar 47, rectangular in cross section, is fitted within the rectangular central passage 45 of the cylinder 44, the bottom end of said bar being forked to provide spaced bearings for the auxilary propelling and steering wheel 48, keyed or otherwise secured to a transverse shaft 49, said shaft having at its outer end a spur gear 50 adapted to mesh with the annular gear 41 and to be driven thereby. The gear 50 is loosely mounted on the shaft 49, said shaft having a reduced squared portion 51 and terminating in a screw threaded end portion 52 adapted to receive a locking nut 53. A clutch washer 54 having a pair of transversely extending lugs 55 and having a square hole therethrough adapted to fit on the reduced squared portion 51 of the shaft 49 is provided to form a selective driving or non-driving connection between the gear 50 and the traction wheels 48, this clutch washer 54 having its lugs 55 extending into corresponding recesses in the hub portion of the gear 50 when it is desired that the wheels 48 be driven. When it is desired to disconnect the drive from the wheels 48 and to permit them to run idle to act as rollers, the nut 53 is removed, the washer 54 removed and reversed so that the lugs 55 no longer enter the recesses in the hub of the gear 50 and the nut 53 replaced, at which time there is no positive drive connection between the gear 50 and the shaft 49. At or near the bottom or lower end of the rod 47 and at a point above the forked end thereof, I provide an annular collar 56 formed integrally with or rigidly attached to the rod 47, and having an annular groove adapted to receive the inner ends of radial locking pins 57 which project through the lower portion of the cylinder 40, whereby said rod 47 and sleeve 40 are free to rotate relative to each other but cannot move up or down independently of each other.

In the embodiment of my invention shown in Figs. 5 to 8 inclusive, novel means are provided for effecting the vertical movement of the various parts within the stationary cylinder 35 and the driving of the traction wheels 48 at the moment that the cylinder 40 and rod 47 have been projected downwardly from the cylinder 35 a predetermined distance. The inner surface of the stationary cylinder 35 is provided with a vertically extending groove 58 having an opening 59 at its lower end extending through the wall of the cylinder and at the upper end of the cylinder I provide an annular space 60 of a diameter greater than the central bore of the cylinder 35. At or near the upper end of the inner cylinder 40 I provide a locking pin 61 extending radially beyond the outer surface of the said cylinder and normally held in an outer position by means of a coil spring 62. This locking pin 61, when in its outer position, as shown in Fig. 5 extends through the wall of the cylinder 40 but does not extend into contact with the inner cylinder 42.

At or near the upper end of the cylinder 40, at a point diametrically opposite the locking pin 61, I provide a short axially extending groove 63 having its upper end terminating at the end of the sleeve 40 and having its lower end terminating at a point somewhat below the level of the normal position of the locking pin 61. This groove 63 has its walls formed to constitute a single ratchet tooth which is adapted to coact with a spring-pressed pawl 64 as best shown in Fig. 6, said pawl and ratchet functioning to permit rotation of the cylinder 40 in one direction but preventing said cylinder from rotating in an opposite direction. The pawl 64 is carried at the inner end of a pin 65 which extends through the wall of the cylinder 35 and is provided with a pin or collar 66 which limits the inward movement of the pawl 64. The outer end of the pin 65 is connected to a pivoted striker 67, said striker contacting with a bell 68 constituting an audible signal to inform the operator that the pin 61 is out of the groove 58 and that the lowering or elevating or driving mechanisms are not operating.

Assuming that the parts are in the position shown in Fig. 5, and the rotation is imparted to the gear 39, such rotation will be transmitted to the inner cylinder 42 and, due to the screw connection with the cylinder 40, the said cylinder 40 will be projected downwardly from the stationary cylinder 35. The locking pin 61, during the downward movement enters and rides in the vertical groove 58 and prevents rotation of the cylinder 40 during its downward movement. Just as soon as the cylinder 40 approaches the limit of the downward movement the locking pin 61 contacts with a pivoted pawl 69 which extends into the cylinder 35 through the opening 59 immediately below the lower end of the groove 58. This pivoted pawl 69 is normally urged into the cylinder 35 by a spring 70 which is of greater strength than the spring 62 of the pin 61, and just as soon as the locking pin 61 engages the cammed surface of the pawl 69, said pin 61 is forced inwardly so that its inner end enters a recess 71 in the cylinder 42, thus locking these two sleeves against further relative vertical movement and establishing a positive drive connection between these two cylinders and causing them to rotate in unison. The lower end of the vertical groove 58 in the cylinder 35 is sloped downwardly and inwardly to form a cammed surface which will coact with the pin 61 to force said pin inwardly in the event that the pivoted pawl 69 is not in its normal position at the time that the pin 61 approaches the limit of its downward movement. The rotation of the cylinder 40 causes a corresponding rotation of the gears 41 and 50 and hence the traction wheel 48 is driven, the direction of rotation of said traction wheel being dependent on the direction of rotation of the gear 34. It is to be noted that the pawl 64 is positioned at a point diametrically opposite the locking pin 61 so that as soon as the pawl enters the groove 63 when the gears are driven in the proper direction to force this auxiliary wheel down toward the ground, the pin 61 is in a position directly above the vertical groove 58. Should the gears be driven in a direction opposite to that necessary to lower the auxiliary wheels, the sloping wall of the groove 63 will force the spring-pressed pawl 64 out of the groove and the cylinder 40 will rotate with the driven cylinder 42 without deriving any vertical movement therefrom. During such rotation, the pin 61 rotates in the annular space 60 at the upper end of the stationary cylinder 35 and the pawl 64 is moved back and forth, then causing the striker 67 to tap or contact with the bell to notify the operator that the device is being operated in the wrong direction to accomplish the downward movement of the traction wheels.

Assuming that all of the traction wheels 48 have been projected into their ground-engaging position by the mechanism above described and that the wheels of the vehicle to which the device is attached have been lifted say three inches off of the ground, the vehicle can then be propelled by the said auxiliary wheels to the right, or left of the normal line of travel of the vehicle.

*Means for raising the auxiliary propelling wheels*

When it is desired to lower the wheels of the vehicle into their normal ground-engaging position, and to raise the auxiliary propelling means to their inoperative position beneath the vehicle, the operator pulls on the chain or cable 72 which moves the pivoted pawl 69 out of the bottom of the slot or groove 58 and permits the spring-pressed locking pin 61, which has been rotating in the annular chamber 73, to enter the slot or groove 58. This outward movement of the locking pin 61 disconnects the driving connection between the cylinders 40 and 42 and holds the cylinder 40 against rotation due to the engagement between the locking pin 61 and the slot or groove 58. If the sleeve 42 is rotating in the proper direction the sleeve 40 is immediately drawn up into the stationary cylinder 35 without further manipulation by the operator of the vehicle. If, however, the cylinder 42 is rotating in the wrong direction to cause the threaded engagement between the cylinders 40 and 42 to raise the cylinder 40, the operator moves the control lever 22 to cause the drive to be transmitted to the cylinder 42 in the reverse direction, at which time the cylinder 40 is readily drawn up into the stationary cylinder 35. This upward movement of the cylinder 40 continues until the locking pin 61 passes out of the slot 58 and into the space 60 at the top of the stationary cylinder 35, at which time the cylinder 40 is free to revolve with the driving cylinder 42 and no further upward movement of cylinder 40 is required. When this condition prevails, the pawl 64 is moved back and forth by repeated contact with the ratchet groove 63 as the cylinder 40 revolves and the bell is struck by the striker 67 to warn the operator that the device has reached its limit of upward movement and that the power should be disconnected from the auxiliary propelling means, which is effected by returning the control lever 22 to its neutral position. The chain or cable 72 from each of the jacks is connected to a handle 72a positioned on the dash board of the vehicle, an outward pull of said handle causing a combined pull on all of the chains or cables 72 and effecting a simultaneous movement of the pawls 69 out of their positions at the bottom of the slots 58.

*Axle locking device*

In order to raise the ground-engaging wheels of the vehicle from the ground as above described, it is of course necessary that a positive connection be established between the chassis frame and the front and rear axles, for without such positive connection, the springs of the vehicle would expand as the chassis is raised and the wheels would not be raised from the ground. In order to effect this positive connection between the axles and the chassis frame, I provide an L-shaped locking lever 74, pivoted to a bracket 75 rigidly attached to the chassis beams at points near the cylinders 35. This lever 74 is pivoted at a point intermediate the ends of its vertical arm and has its upper end connected to a tension spring 74a. As a means for automatically moving this axle locking lever 74 into engagement beneath the axle of the vehicle, I provide the lower end of each of the cylinders 40 with an annular ball race 76 and attach to one side of the outer member of the ball race a forwardly and upwardly extending cam strip 77, so shaped and positioned that it will be moved up and down with the vertically-moving cylinder 40. During the downward movement of the cylinder 40 the cam strip 77 will be forced into engagement with the axle locking lever 74 to cause the same to engage beneath the axle, whereas, on the upward movement of the cylinder 40, the cam strip will clear the locking lever 74 and the spring 74a will return to its normal position, as best shown in Fig. 2.

*Means for steering auxiliary propelling wheels*

In order to accomplish steering of the auxiliary propelling wheels 48, so that the direction of movement of the vehicle may be under the direct control of the operator, I provide a reel or pulley 46 positioned at the upper end of each of the cylinders 44, it being understood that rotating the cylinders 44 effects a corresponding movement of the rods 47 and the traction wheels 48 carried at the lower ends thereof. Instead of integrally forming the reel or pulley 46 on the top of the cylinder 44, it may be desirable to attach said reel or pulley 46 at the top of a shaft positioned at the upper end of the cylinder 44 in such a manner that the drive between said shaft and reel or pulley may be selectively engaged or disengaged. A convenient means for accomplishing this selective attachment is shown in detail in Figs. 18, 19 and 20. In this construction, the reel or drum 46 is loosely mounted on the upper end of the cylinder 44, this upper end having a reduced, squared portion 51a terminating in a further reduced, screw-threaded portion 52a, adapted to receive a locking nut 53a. A clutch washer 54a having a pair of axially extending lugs 55a and having a square hole therethrough adapted to fit on the reduced, squared portion 51a of the cylinder 44, is provided, to form a selective driving or non-driving connection between the reel or drum 46 and the cylinder 44, this clutch washer 54a having its lugs 55a extending into corresponding recesses in the upper face of the reel or drum 46 when it is desired to transmit rotary motion from said reel or drum 46 to the cylinder 44 to steer the auxiliary steering and driving wheel associated with said cylinder. When it is desired to disconnect the steering drive from the reel or drum 46 to the cylinder 44, to permit the cylinder and its associated wheel to rotate freely and independently of the position or rotation of the steering reel or drum 46, the nut 53a is removed; the washer 54a removed and reversed so that the lugs 55a of the clutch washer no longer enter the recesses in the upper face of the reel or drum 46; and the nut 53a replaced; at which time the parts are in the position shown in Fig. 20 and there is no positive drive connection between the reel or drum 46 and the cylinder 44. On the steering shaft 5, I mount a drum 78, said drum being loosely mounted on said shaft so that it is not normally rotated when the shaft 5 is turned. In order to connect the drum 78 with the shaft 5 so that it will rotate therewith I provide a slidable clutching sleeve 79 keyed or otherwise secured to the shaft 5 and adapted to rotate therewith, and provided with axially extending end lugs adapted to coact with corresponding recesses in the upper end of the drum 78 when said clutching sleeve 79 is moved downwardly along the shaft 5. For effecting the automatic engagement between the clutching sleeve 79 and the drum 78, I connect the said clutching sleeve 79 to each of the four axle locking levers 74 by means of chains or cables 80 suitably guided over pulleys secured to the chassis beams and other parts of the frame so that when the said locking levers 74 are moved into axle engaging position as above described, these chains or cables 80 pull the clutching sleeve 79 downwardly along the shaft 5 against the tension of the spring 81 and cause the lugs on the lower end of the said sleeve to engage the corresponding recesses in the upper end of the drum 78, whereby rotation of the shaft 5 will cause a corresponding rotation of the drum 78. As soon as the auxiliary propelling wheels are raised to their upper position and the axle locking members 74 removed from beneath the axles, the spring 81 pulls the clutching sleeve 79 upwardly along the shaft 5, thus disconnecting the driving connection between the steering shaft 5 and the drum 78.

A chain or cable 82 is wound around the drum 78 and has two or more turns around each of the reels or pulleys 46 positioned at the top of each of the four stationary cylinders 35. This chain or cable 82 is guided from one reel or pulley 46 to the other and to the drum 78 over suitable guide pulleys 83 positioned at convenient points along the chassis and frame and is so arranged that when the drum 78 is rotated in one direction, the individual traction wheels will be turned to the right and when rotated in the opposite direction, the said individual wheels will be turned to the left.

*Auxiliary propelling wheel position indicator*

In addition to being wrapped around the reels or pulleys 46 and drum 78, the chain or cable 82 is wrapped around the drum of an indicating device 84 provided with arrows and positioned on the floor board or dash board of the vehicle within the view of the operator, it being understood that this indicator is so arranged that it moves with the drum 78 and informs the operator of the direction in which the auxiliary wheels 48 are positioned, whereby the operator can readily determine which way to turn the steering shaft 5 to steer the vehicle in the desired direction when being driven by the auxiliary propelling means.

*Bumper or safety device*

In order to automatically stop the auxiliary propelling device when the vehicle is about to run into a curbing or other obstruction, I provide one or more bumpers or safety devices mounted at one or both sides of the vehicle and adapted to automatically disconnect the driving means between the motor 3 and the auxiliary propelling means. This preferred embodiment of this feature of my invention comprises a bar or bumper 85 pivoted beneath the running board of the vehicle at the right hand side of the same. This bar or bumper 85 is pivotally mounted near its inner end to a plate 86, which plate is pivotally mounted beneath the running board on a pin or bolt 87, the forward end of the plate 86 being bent downwardly so that the bar or bumper 85 will lie directly beneath the running board when it is in its normal position, but will extend downwardly toward the ground when the bar or bumper is moved to a position at right angles to the side of the vehicle. At a point to the rear of the pivot 87, the plate 86 is connected to a bar 88 which extends inwardly toward the center of the machine and connects with a bell crank lever 89 pivotally mounted on a stationary part of the chassis and having its inner end positioned near the rear end of the longitudinally movable shaft 21. The inner end of the bar or bumper 85 is connected by a rod 90 to a lug 91 through a universal ball and socket connection 92, said lug 91 being formed integrally with or rigidly attached to the outer member of the ball race 76 of the front auxiliary propelling device at the right side of the vehicle. Due to this connection between the bar or bumper 85 and the ball race 76, the rod 90 pulls the bar or bumper 85 about its pivot on the plate 86 and causes the same to assume a position at right angles to the side of the vehicle whenever this front auxiliary propelling device is lowered into ground-engaging position. When the front auxiliary propelling device is raised, the rod 90 pushes this inner end of the bar or bumper 85 and causes said bar or bumper to move about its pivot and to return to its normal raised position beneath the running board.

Assuming that the vehicle has been raised and that the auxiliary propelling wheels are driving the vehicle to the right into a parking space at the side of a curb, the bar or bumper 85 extends at right angles to the right side of the vehicle and just as soon as the outer end of the bar or bumper contacts with the curb or other obstruction, the forward end of the plate 86 is moved inwardly about its pivot 87 and the rear end of the plate is moved outwardly about the pivot 87, such movement pulling the rod 88 and causing the bell-crank lever 89 to move about its pivot and to force the rod 21 toward the front of the vehicle a sufficient distance to cause the spool gear on the shaft 15 to assume a neutral position and to thus disconnect the drive to the auxiliary propelling wheels. In Fig. 2, I have shown a bar or bumper 85 positioned at the left side of the vehicle adapted to be moved into operative position and to arrest the drive of the vehicle toward the left, the construction and operation of this bumper or safety device being substantially the same as that above described in connection with the device positioned at the right side of the vehicle.

Visual parking signal

In order to inform pedestrians or other motorists of the fact that the vehicle is about to be moved to the right, or left of its normal position, as when it is desired to park the vehicle at the curb or to remove the vehicle from its parking space at the curb, I provide a visual signal device and connections for illuminating said signal during such movements. Referring particularly to Figs. 1 and 3, it will be noted that the longitudinally slidable bar 21 is provided with spaced inwardly extending arms 93 and 94 each adapted to bridge spaced electrical contacts 95 and 96 respectively connected through suitable wiring to the battery 97 and signal lamps in the illuminated signal box 98 positioned preferably at the rear left side of the vehicle. The signal box 98 is divided into three compartments, the central compartment having its open face containing the word "Parking" and the end compartments having their open faces covered with a hand or arrow pointing toward the right or left side of the vehicle. Within this central compartment are two lights 99 and 100 and in the end compartments are signal lights 101 and 102, the two lights 99 and 101 being in the circuit controlled by the contacts 96 and the two lights 100 and 102 being in the circuit controlled by the contact 95.

It is thus apparent that whenever the rod 21 is moved forward by the operation of the lever 22 to effect the drive of the auxiliary propelling means to move the vehicle toward the left, that the contact arm 93 will bridge the spaced contacts 95 and complete the electric circuit between the battery 97 and the two lights 100 and 102, thus causing said lights to illuminate the "parking" signal and the arrow or other means, to indicate to pedestrians, or other motorists, that the vehicle is about to be moved to the left. Obviously, when the rod 21 is moved toward the rear of the vehicle by operation of the lever 22 to effect the drive of the auxiliary propelling means to move the vehicle toward the right, the contact arm 94 will bridge the spaced contacts 96 and complete the electric circuit between the battery 97 and the two lights 99 and 101, thus causing said lights to illuminate the "parking" signal and the arrow or other means to indicate to pedestrians or other motorists that the vehicle is about to be moved to the right.

Adjustable jack construction

In Figs. 9 and 10 I have shown means whereby the length that the cylinder 40 projects below the stationary casing 35 may be adjusted to enable the jack or jacks to be applied to vehicles having different diameter wheels or tires or different height chassis frames. In this instance the pawl 69 is mounted in a vertically adjustable block 103 having spaced side members 104 and 105 between which the pawl 69 is pivotally mounted and having an upwardly extending portion 106 for accommodating the spring 70 which normally forces the pawl 69 into the space at the bottom of the vertical groove 58 in the stationary cylinder 35. The block 103 is supported on a vertically extending screw 107 which is threaded into a lug extending from the stationary cylinder 35. Rotation of this screw causes the block 103 and the pawl mounted thereon to move up and down along the lower portion of the slot 58, the vertical position of the pawl 59 determining the point at which the locking pin 61 is forced inwardly to connect the cylinders 42 and 40 and thus determine the length that the sleeve 40 and traction wheels 48 will project below the stationary cylinder 35 before the vertical movement of the sleeve 40 is arrested and its rotation commenced to impart rotation to the wheels 48. In order to adjust the chain or cable 72 to correspond to the adjustment of the pawl 69, I provide the outer end of said pawl with a set screw 108 which is adapted to engage the chain or cable 72 so that an upward pull on said cable will cause the pawl 69 to move out of the lower end of the slot or groove 58 at any vertical position of the block 103 to permit the locking pin 61 to enter the slot or groove 58.

Selective front or rear jack drive

In order to permit the front or rear pairs of lifting jacks to be operated independently of each other, for example where it is desired to lift only the front or rear end of the vehicle and to permit the normal ground engaging wheels at one end of the vehicle to remain in contact with the ground, I provide means for selectively driving the operating mechanism of either pair of jacks, said means being disclosed in Figs. 12 and 13 of the accompanying drawings. In this embodiment of my invention the shafts 26 and 29, instead of extending the full length of the chassis frame, are split near their central portions and means are provided for selectively driving either the forward or rearward ends of said shaft. As shown in Fig. 12, the driving means for the front and rear jacks at the right side of the vehicle comprises two sections of shafting 109 and 110, each section having drive sprockets 111 and 112 respectively, connected by sprocket chains 113 and 114 to shaft sections 115 and 116. In this construction, the drive pinion 25, instead of being directly connected to the shaft as in the form of the invention shown in Fig. 1, is mounted on a sleeve 117, the construction of said sleeve and the hub of the drive pinion 25 being such that the sleeve 117 may slide along the abutting end of the shaft 109 and 110 but will still be rotated by the drive pinion 25. This sleeve 117 surrounds the abutting ends of the shafts 109 and 110 and has its ends slotted at diametrically opposite sides as shown at 118. The slotted ends 118 of the sleeve 117 are adapted to engage transversely extending pins 120 and 121 which pass through the shafts 109 and 110 respectively. In the normal position of the sleeve 117, the slots 118 engage both the pins 120 and 121 and hence rotation of the sleeve by the gear 25 will effect rotation of the shafts 109 and 110 which, through sprockets 111 and 112 and sprocket chains 113 and 114, imparts rotation to the shafts 115 and 116 at the opposite side of the chassis. When this condition prevails, all four of the lifting jacks are operated. When it is desired to drive only the two lifting jacks at the front of the vehicle, the operator moves the sleeve 117 by means of the control lever 122, so that the slot 118 at the rear of the sleeve 117 clears the pin 120 and hence the shaft 110 and its corresponding shaft 116 at the opposite side of the vehicle are not rotated and the rear lifting jacks remain in their normal position. When the sleeve 117 is disengaged from the pin 120, the sleeve will drive the forward shaft 109, and through the sprocket 111 and sprocket chain 113, the forward shaft 115 at the opposite side of the chassis, and hence the two jacks at the front of the chassis will lift the front wheels off of the ground and propel the front end of the vehicle in the desired direction. When it is desired to drive only the two jacks at the rear of the chassis, the sleeve 117 is moved to disengage the slot 118 from the pin 121 and the drive is then transmitted to the two rear shafts 110 and 116 only.

Automatic clutch release operated by movement of rear jacks

In order to move the main clutch pedal 8 to cause the clutch of the vehicle to be disengaged automatically when the rear jacks are lowered, I connect the clutch pedal 8 to the cable 80 above described in connection with the means for automatically connecting the clutching sleeve 79 with the drum 78. This connection is made by a chain or cable 123 which extends downwardly, around a guide pulley 124 and rearwardly where its end is connected to the chain or cable 80. It is thus apparent that the chain or cable 123 will be pulled by the cable 80 when the rear jacks are lowered into ground-engaging position, this movement causing a downward movement of the clutch pedal 8 and the disengagement of the main clutch of the vehicle. The main clutch is held in disengaged position as long as the rear jacks are in contact with the ground and as the said rear jacks are raised from the ground, the pull on the chains or cable 80 and 123 is removed and the clutch pedal 8 returns to its normal position, thus engaging the clutch of the vehicle. Such an arrangement is desirable to prevent the driving of the rear wheels of the vehicle while the rear auxiliary wheels are on or in close contact with the ground.

Selective drive for individual jack members

Referring to Fig. 5, of the accompanying drawings, it will be noted that the power for raising and lowering and driving the individual auxiliary propelling wheels is transmitted through a vertically extending shaft 37 which derives its rotation from the gears 28 or 34 and transmits such rotation to the gear 43 through the gear 38. In Fig. 11, I have shown a modification of this arrangement, by means of which the drive of any of the jacks may be disconnected. In this form of my invention the shaft 37 instead of being of a continuous length, is split transversely to form two shaft sections 125 and 126, having their abutting ends enclosed in a vertically adjustable clutching sleeve 127, keyed to the lower end of the shaft section 125. The lower edge of the sleeve 127 is notched as at 128, which notches are adapted to engage coacting lugs 129 extending from the upper end of a collar 130 rigidly secured at the upper end of the shaft section 126. When the clutching sleeve 127 is in its normal position as shown in full lines in Fig. 11, the lugs 129 enter recesses 128 and the rotation of the shaft section 126 is transmitted to the shaft section 125. When, however, it is desired to disconnect the shaft section so that the raising or lowering or driving mechanism of any particular jack may be disconnected from the main drive independently of the operation of any of the remaining jacks of the series, the operator moves the clutching sleeve 127 upwardly along the shaft section 125 until the arm 131 engages a spring catch 132 secured to the side of the stationary cylinder 35, which catch functions to hold the sleeve 127 in its upward position with the lugs 129 disengaged from the recesses 128. In this position, the drive from the shaft 126 is not transmitted to the shaft 125 and hence the particular jack is not driven. This declutching operation can be made when the auxiliary propelling wheels are either in their normal raised position or in their ground-engaging position. If the auxiliary wheels are in contact with the ground when the drive is disconnected, they are free to rotate as rollers, their direction, for steering purposes, however, being under control of the operation through the steering shaft 5. In the event that the reel or pulley 46 has been disengaged from its shaft, the wheels 48 are not steered, but are free to turn in any direction desired and hence the wheels, being demounted from their steering and driving mechanism, are free to rotate and turn in any direction.

*Electrical control system*

As an alternative method of controlling the driving connection between the motor 3 and the auxiliary propelling means, I provide an electrical control system to take the place of the operating lever 22, said control system operating to effect the selective engagement between the gear 24 and either of the gears 18 or 19, depending upon the direction of rotation desired to be imparted to the auxiliary propelling means. This electric control system includes a pair of solenoids for causing the selective engagement between the gears 18 and 19 and the gear 24, and further includes a switching mechanism actuated by the bar or bumper 85 to automatically interrupt the circuit and thus disconnect the drive mechanism when the said bar or bumper 85 contacts with a curb or other obstruction. Means are further provided for establishing the circuit to effect the drive in the opposite direction even though the circuit interrupted by the movement of the bar or bumper 85 is still in open condition.

Referring to Fig. 14 of the accompanying drawings, the shaft 15 carries a spool gear having the gears 18 and 19 both of which may be disengaged from the gear 24 to maintain the spool gear in neutral position, or either of which may be engaged with the gear 24 to drive the auxiliary propelling means to propel the vehicle to the right or left. A pivoted shifting arm or lever 133 has its upper end connected to the spool gear and its lower end connected to a bar 134 extending between the cores of two solenoids R and L, a spring 135 being connected to the arm or lever 133 to normally hold the spool gear in its neutral position. A control switch S is mounted on the dash board in convenient reach of the operator and is adapted to close either of the contacts $r$ or $l$ to energize either the solenoid R or L respectively. The switch and contacts are suitably connected by circuits to be presently described, with a battery B and the circuits include several solenoids $a$, $b$ and $c$ for controlling the several circuits.

Assuming that the switch lever S is moved to the contact $r$ to energize the main solenoid R and engage the gear 19 with the gear 24 to propel the vehicle to the right. This movement of the lever S establishes a circuit from the battery B through $d$—$e$ through the lever S to contact $r$—$f$ solenoid $a$—$g$ contact $h$— armature $i$— control $j$—$k$ and back to battery B. This energizes the solenoid $a$ which attracts the armature $m$ to close contact $n$, which completes the circuit to the main solenoid R through the lines $o$—$p$—$q$—$t$— contact $h$— armature $i$— contact $j$—$k$— and back to battery B. This effects the proper gear connection to propel the vehicle to the right of its normal line of travel.

While moving in this direction, if the bar or bumper 85 contacts with the curb or other obstruction, the bridge piece $u$ carried at the inner end of the bumper 85 closes contacts $v$ and $w$ and energizes the solenoid $c$, this circuit being completed through $x$—$y$— and $k$ to battery B. When the solenoid $c$ is thus energized the bridge piece or armature $i$ is raised to open the circuit between the contacts $h$ and $j$, thus de-energizing the solenoid R and permitting the spring 135 to return the spool gear on the shaft 15 to a neutral position.

A similar set of circuits is provided through the solenoids $b$ and L when the switch lever S is moved to close the contact $l$ to reverse the direction of rotation of the shaft 15 and thus reverse the movement of the vehicle.

Assuming that it is desired to move the vehicle toward the left and that the bar or bumper 85 is still in contact with the curb or obstruction and that the bridge piece $u$ has closed the contacts $v$ and $w$, it is apparent that means must be provided for energizing the solenoid L through some circuit other than that completed by the armature $i$ and contacts *h* and *j*. This is accomplished by providing an auxiliary shunt circuit terminating in contacts *aa* and *bb* adjacent the switch lever S. An auxiliary contact *cc* is connected to the same line on the contact *l* and is in alinement with the contacts *aa*, *bb*, so that all three contacts can be bridged by the switch lever S when said lever is moved to its extreme left position.

When the lever S is moved to its extreme left position, a circuit is established from the battery B through lines *d* and *e*— through lever S— contact *cc*— line *dd*— solenoid *b*— lines *g—t—ii*— contact *aa*— switch lever S, contact *bb*— line *ee*— and back to battery B, thus energizing solenoid *b*. This solenoid *b* lifts the armature *jj* into engagement with the contact *f*, *f*, whereby the solenoid L is energized through lines *gg—hh—q—ii*— contact *aa*— switch lever S—contact *bb*— lines *ee*— and back to battery.

General operation

It will thus be seen that I have provided a highly efficient and satisfactory form of auxiliary propelling means for motor vehicles, which may be attached to automobiles, trucks, tractors or the like to act as an accessory to the normal propelling means of the vehicle and which will function to bodily raise the normal ground-engaging wheels of the vehicle off of the ground, and to move the said vehicle to the right or left or in any direction desired, the direction of such movement being under the control of the operator through the usual steering wheel and steering shaft of the vehicle. When the vehicle is completely jacked up by the novel elevating means above described in detail, the auxiliary propelling means is directly coupled to the internal combustion engine or other power plant of the vehicle in a manner such that the auxiliary traction wheels positioned at the lower end of said elevations means are driven to propel the vehicle to the right or left, the direction of rotation of said wheels being under the control of the operator through the medium of a single operating lever or switch and the individual traction wheel being connected to the steering shaft of the vehicle so that, by rotating the said steering shaft, the direction of travel of the vehicle may be altered and controlled and the vehicle thus moved to the right, left, front or rear at the will of the operator. Primarily, the device is intended to provide an auxiliary propelling means whereby the vehicle may be moved bodily in a sidewise direction so that it may readily move, in a direction at right angles to its length, into or out of a parking space along the side of the curb. During such movements, I have provided means for steering the vehicle in order to avoid contact with the vehicle in front of or to the rear of said parking space. I have also provided a braking device for slowing up or stopping the rotation of the auxiliary traction wheels, such braking device being operated by the usual foot brake of the vehicle, and also a bumper or safety device connected to either the mechanical or electrical control system in such a manner that the main drive to the auxiliary propelling wheels is disconnected at the moment said bumper or safety device contacts with the curb or other obstruction.

While the auxiliary propelling means above described is intended primarily to lift the vehicle bodily off of the ground, that is, to elevate all of the normal ground-engaging wheels from the ground and to support the vehicle in its entirety upon the auxiliary traction and steering wheels, I have provided means whereby either the front wheels or the rear wheels may be left in contact with the ground when the other wheels are raised, by, supported on, and driven by the said auxiliary propelling wheels, thus permitting either end of the vehicle to be moved to the right or left to turn the vehicle in the shortest possible radius or to push or pull the vehicle to the front or rear. In addition to the selective front and rear drive mechanism, I have provided means whereby any one or more of the auxiliary traction wheels may be disconnected from its respective drive mechanism, whereby said wheels may act as rollers, not to propel the vehicle but to enable it to be pushed or pulled by the auxiliary propelling wheels which have not been disconnected, or by external power applied to tow or push the vehicle. In the event that conditions should arise which would make it desirable to have any one or more of the auxiliary traction wheels disconnected from this steering mechanism of the remaining wheels, novel means have been provided to accomplish this purpose.

In constructing this auxiliary propelling drive, I have incorporated therein many novel automatic devices which operate to perform such desirable functions as connecting the steering shaft of the vehicle to the steering means of the auxiliary propelling wheels when said wheels are lowered into contact with the ground, means for automatically disengaging the main clutch of the vehicle and holding said clutch in disengaged position when the rear wheels of the vehicle are out of contact with the ground, means for forcing the auxiliary propelling wheel downwardly into contact with the ground and means for automatically arresting this downward movement and automatically commencing the drive of the auxiliary traction wheels as soon as the said wheels have been projected beneath the vehicle a predetermined distance. In view of the simplicity of control, the many automatic devices of operating without manipulation by the operator of the vehicle, the several adjusting means provided, and the signalling and safety devices included in the apparatus, I have provided a device of this character highly efficient in the purpose for which designed.

Having thus described my invention, I claim:—

1. An auxiliary propelling device for motor vehicles comprising a series of auxiliary traction wheels, means for moving said traction wheels into contact with the ground and for driving them to support and propel the vehicle, an axle locking lever actuated by the downward movement of the traction wheels to engage beneath an axle of the vehicle, and means connected with said axle locking lever and with the steering shaft of the vehicle for connecting said steering shaft to the traction wheels when the axle locking lever is in axle engaging position whereby said steering shaft can control the direction of movement of the vehicle when being supported on or propelled by said traction wheels.

2. An auxiliary propelling device for motor vehicles comprising a series of auxiliary traction wheels, means for moving said traction wheels into contact with the ground and for driving them to support and propel the vehicle, means for steering the individual auxiliary traction wheels, and an operating connection between the steering shaft of the vehicle and each of the steering means for the individual auxiliary traction wheels, whereby said steering shaft can control the direction of movement of the vehicle when being supported on or propelled by said traction wheels.

3. An auxiliary propelling device for motor vehicles comprising a series of auxiliary traction wheels, means for moving said traction wheels into contact with the ground and for driving them to support and propel the vehicle, a drum loosely mounted on the steering shaft of the vehicle, a chain or cable connecting said drum to each of the individual traction wheels whereby rotation of the drum toward the right or left effects a corresponding movement of traction wheels, and means for operatively connecting the drum and steering shaft, whereby said shaft can control the operation of movement of the vehicle when being supported on or propelled by said traction wheels.

4. An auxiliary propelling device for motor vehicles comprising a series of auxiliary traction wheels, means for moving said traction wheels into contact with the ground and for driving them to support and propel the vehicle, a drum loosely mounted on the steering shaft of the vehicle, a drum connected to each of the individual traction wheels, a chain or cable connecting the drum on the steering shaft of the vehicle with each of the drums of the individual traction wheels, whereby said wheels may be steered by rotation of the steering shaft, and means for disconnecting any one or more of the drums of the individual traction wheels from said chain or cable, whereby any traction wheel or wheels may be free to turn independently of the other traction wheels.

5. An auxiliary propelling device for motor vehicles comprising a series of auxiliary traction wheels, means for forcing said traction wheels into contact with the ground and for driving them to support and propel the vehicle, and a connection between said auxiliary traction wheels and the main clutch pedal of the motor vehicle for disconnecting the clutch and maintaining said clutch in disengaged position during the time that said auxiliary traction wheels are in their ground engaging position.

6. In an auxiliary propelling device for motor vehicles comprising a series of auxiliary traction wheels, the combination of means for moving said traction wheels into contact with the ground and for driving them to support and propel the vehicle, means for connecting said traction wheels to the steering gear of the vehicle whereby said steering gear can control the direction of movement of this vehicle when being supported on or propelled by said traction wheels, and a connection between the steering mechanism of the auxiliary traction wheels and the main clutch of the vehicle whereby said clutch is disengaged during the time that said auxiliary traction wheels are in their ground engaging position.

7. An auxiliary propelling device for motor vehicles comprising a series of auxiliary traction wheels, means for forcing said traction wheels into contact with the ground and for driving them to support and propel the vehicle, means for steering said traction wheels to control the direction of movement of the vehicle when supported on or propelled by said traction wheels, and means operated by the brake which controls the main wheels of the vehicle for retarding the drive to the auxiliary traction wheels.

8. An auxiliary propelling device for motor vehicles comprising a series of auxiliary traction wheels, a shaft having a gear in constant mesh with the fly-wheel gear of said vehicle whereby said shaft is rotated when the fly-wheel is driven, means to transmit the rotation of said shaft to the auxiliary traction wheels to force said traction wheels into contact with the ground and for driving them to support and propel the vehicle, and a brake mounted on the shaft and connected to the foot brake of the vehicle for retarding the rotation of the shaft and hence the drive to the auxiliary traction wheels.

9. An auxiliary propelling device for motor vehicles comprising a series of auxiliary traction wheels, means for forcing said traction wheels into contact with the ground and for driving them to support and propel the vehicle, and a safety device associated with said driving means and adapted to disconnect the drive to the auxiliary traction wheels when said safety device contacts with a curbing or other obstruction when the vehicle is being propelled by said auxiliary traction wheels.

10. An auxiliary propelling device for motor vehicles comprising a series of auxiliary traction wheels, a drive mechanism for said auxiliary traction wheels adapted to raise or lower said auxiliary traction wheels and to impart rotation thereto, an operating lever for controlling the raising and lowering movements and the direction of rotation of said auxiliary traction wheels, and a safety device associated with said driving means and adapted to disconnect the drive to the auxiliary traction wheels when said safety device contacts with a curbing or other obstruction when the vehicle is being propelled by said auxiliary traction wheels.

11. An auxiliary propelling device for motor vehicles comprising a series of auxiliary traction wheels, means for forcing said traction wheels into contact with the ground and for driving them to support and propel the vehicle, a safety device for automatically disconnecting the driving power of the auxiliary traction wheels when the safety device contacts with a curbing or other obstruction when the vehicle is being propelled by said auxiliary traction wheels, and means for moving the safety device into operative or inoperative position simultaneously with the lowering and raising of the auxiliary traction wheels.

12. An auxiliary propelling device for motor vehicles comprising a series of auxiliary traction wheels, a shaft having a gear in constant mesh with the fly-wheel gear of said vehicle, a gear slidably mounted on said shaft and adapted to be engaged with a main drive gear for the auxiliary propelling device to drive the traction wheels thereof, an operating rod for effecting the engagement between the slidable gear and main drive gear, and a safety device for automatically moving the operating rod to disengage the slidable gear from the main drive gear when said safety device contacts with a curb or other obstruction.

13. An auxiliary propelling device for motor vehicles comprising a series of auxiliary traction wheels, means for forcing said traction wheels into contact with the ground and for driving them to support and propel the vehicle, and means for disconnecting the drive to any of the individual wheels whereby the disconnected wheel or wheels are free to rotate independently of said driving means and the remaining traction wheels of the series.

14. An auxiliary propelling device for motor vehicles comprising a series of auxiliary traction wheels, means for forcing said traction wheels into contact with the ground, gears for rotating each of the individual traction wheels to propel the vehicle, and means for disconnecting the said gear from its associated traction wheel to disconnect the drive to said wheel and to permit the wheel to rotate independently of said driving gear and the remaining traction wheels of the series.

15. An auxiliary propelling device for motor vehicles comprising a series of lifting jacks for raising the wheels of the vehicle out of contact with the ground, an auxiliary traction wheel mounted on a shaft at the lower end of each lifting jack, a gear mounted on said shaft, means for driving said gear to normally rotate the auxiliary traction wheels to propel the vehicle supported thereon and means for disconnecting the drive between the gear and traction wheel to permit the wheel to rotate independently of said gear.

16. An auxiliary propelling device for motor vehicles comprising a series of lifting jacks for raising the wheels of the vehicle out of contact with the ground, an auxiliary traction wheel mounted on a transverse shaft at the lower end of each lifting jack and adapted to rotate with said shaft, a driving gear loosely mounted on said shaft, and means for selectively coupling said gear and shaft so that the rotation of the gear will be transmitted to the shaft and auxiliary traction wheel to propel the vehicle supported thereon, or so that the drive will not be transmitted and the auxiliary wheel will be free to rotate independently of said gear.

17. An auxiliary propelling device for motor vehicles comprising a series of lifting jacks, means for operating said jacks to raise the wheels of the vehicle out of contact with the ground, an auxiliary traction wheel mounted at the lower end of each jack, means for driving the jacks and auxiliary traction wheels, means for disconnecting the drive to any of the lifting jacks and their respective traction wheels independently of the drive to the remaining jacks and auxiliary traction wheels, and means for disconnecting the drive of any of the traction wheels independently of the jack driving means.

18. An auxiliary propelling device for motor vehicles comprising a series of lifting jacks, an auxiliary traction wheel carried at the lower end of each of said jacks, an individual power shaft for operating each of the jacks to raise the wheels of the vehicle out of contact with the ground and to drive the auxiliary traction wheels to propel the vehicle, and a clutch on each shaft whereby any one of the lifting jacks and their respective traction wheels may be disconnected independently of the remaining jacks of the series.

19. An auxiliary propelling device for motor vehicles comprising a series of lifting jacks, auxiliary traction wheels carried at the lower end of each of said jacks, shafts for operating each of the jacks to raise the wheels of the vehicle out of contact with the ground and to support the vehicle on said auxiliary traction wheels, a clutch on each of said shafts whereby any one of the lifting jacks and their respective traction wheels may be disconnected independently of the remaining jacks of the series, and means for disconnecting the auxiliary traction wheels independently of the clutch or jack operating shafts.

20. An auxiliary propelling device for motor vehicles comprising a pair of lifting jacks attached to the front of the vehicle and a pair of lifting jacks attached to the rear of the vehicle, auxiliary traction wheels carried at the lower end of each of said jacks and adapted to support and propel the vehicle when the jacks have lifted the vehicle wheels out of contact with the ground, means for driving all of the lifting jacks and their respective traction wheels, and means whereby either the front pair of jacks or rear pair of jacks may be rendered inoperative.

21. An auxiliary propelling device for motor vehicles comprising a pair of lifting jacks attached to the front of the vehicle and a pair of lifting jacks attached to the rear of the vehicle, auxiliary traction wheels carried at the lower end of each of said jacks and adapted to support and propel the vehicle when the jacks have lifted the vehicle wheels out of contact with the ground, drive connections between the motor of the vehicle and each of the individual lifting jacks, said drive connection including a split shaft, and a clutching sleeve adapted to connect the drive from the motor to either the front or rear pair of jacks or to both pairs of said jacks at the will of the operator.

22. An auxiliary propelling device for motor vehicles comprising a series of lifting jacks having auxiliary traction wheels at their lower ends, operating means for forcing the lifting jacks downwardly to support the vehicle on said auxiliary traction wheels, means for automatically disconnecting the jack operating means and commencing the drive of the auxiliary traction wheels as soon as said jacks have been lowered a predetermined distance, and means for adjusting the position at which the jack operating mechanism is disconnected and the drive to the auxiliary traction wheels applied.

23. An auxiliary propelling device for motor vehicles, comprising a series of lifting jacks having auxiliary traction wheels at their lower ends, operating means for forcing the lifting jacks downwardly to support the vehicle on said traction wheels and to drive said wheels to propel the vehicle, a locking pin carried by the jack and adapted to connect the power from the jack to the auxiliary propelling wheels, an abutment adapted to be engaged by the locking pin when the jack has been lowered a predetermined distance to disconnect the drive to the jack and to apply the drive to the traction wheel, and means for adjusting the position of the abutment so that the movement of the jack and the drive to the auxiliary traction wheels can be regulated.

24. In an auxiliary propelling device for motor vehicles, the combination of a series of lifting jacks having auxiliary traction wheels, means for forcing said traction wheels into contact with the ground and for driving them to support and propel the vehicle, means for reversing the direction of rotation of said auxiliary wheels so that the vehicle may be propelled to the right or left of its normal line of travel, and a signal device associated with the vehicle and connected to the drive mechanism of the auxiliary propelling device to inform pedestrians or other motorists that the vehicle is about to be moved and in which direction the movement is to be made.

25. In an auxiliary propelling device for motor vehicles, the combination of means for forcing said traction wheels into contact with the ground and for driving them to support and propel the vehicle, means for steering said traction wheels to control the direction of movement of the vehicle when supported on or propelled by said traction wheels, and an indicator for informing the operator of the position of said auxiliary traction wheels.

26. In an auxiliary propelling device for motor vehicles the combination of a series of auxiliary traction wheels, means for moving said traction wheels into contact with the ground and for driving them to support and propel the vehicle, a drum mounted on the steering shaft of the vehicle, a chain or cable connecting said drum to each of the individual traction wheels whereby rotation of the drum effects a corresponding movement of the traction wheels, and an indicator operated by the chain or cable for informing the operator of the position of said auxiliary traction wheels.

In testimony whereof I hereunto affix my signature.

ARTHUR E. MILLER.